United States Patent [19]

Hikata et al.

[11] Patent Number: 5,346,863
[45] Date of Patent: Sep. 13, 1994

[54] LOW TEMPERATURE SEALING COMPOSITION

[75] Inventors: Hajime Hikata; Kumi Tanaka; Kazuyoshi Shindo, all of Shiga, Japan

[73] Assignee: Nippon Electric Glass Co., Ltd., Otsu, Japan

[21] Appl. No.: 164,136

[22] Filed: Dec. 8, 1993

[30] Foreign Application Priority Data

Dec. 11, 1992 [JP] Japan .................. 4-353124

[51] Int. Cl.$^5$ ............................ C03C 8/10; C03C 8/24
[52] U.S. Cl. .......................... 501/17; 501/17; 501/22; 501/75; 501/41
[58] Field of Search ............... 501/15, 17, 18, 22, 501/75, 76, 23, 41

[56] References Cited

U.S. PATENT DOCUMENTS

| | | | |
|---|---|---|---|
| 4,310,357 | 1/1982 | Matsuura et al. | 501/22 X |
| 4,365,021 | 12/1982 | Pirooz | 501/15 |
| 4,696,909 | 9/1987 | Weaver | 501/22 X |
| 4,704,370 | 11/1987 | Seki et al. | 501/15 |
| 4,743,302 | 5/1988 | Dumesail et al. | |
| 5,281,561 | 1/1994 | Dumesnil et al. | 501/15 X |

FOREIGN PATENT DOCUMENTS

| | | |
|---|---|---|
| 8060 | 2/1988 | Japan . |
| 229738 | 9/1990 | Japan . |

*Primary Examiner*—Karl Group
*Attorney, Agent, or Firm*—Collard & Roe

[57] ABSTRACT

A low temperature sealing composition consists essentially of 45.0 to 85.0 wt. % of PbO, 1.0 to 11.0 wt. % of $B_2O_3$, 1.0 to 45.0 wt. % of $Bi_2O_3$, 0.2 to 10.0 wt. % of $Fe_2O_3$, 0 to 15.0 wt. % of ZnO, 0 to 5.0 wt. % of CuO, 0 to 5.0 wt. % of $V_2O_5$, 0 to 3.0 wt. % of $SnO_2$, 0 to 5.0 wt. % of $SiO_2$ plus $Al_2O_3$, 0 to 7.0 wt. % of BaO, 0 to 5.0 wt. % of $TiO_2$, 0 to 5.0 wt. % of $ZrO_2$ and 0 to 6.0 wt. % of $F_2$. The sealing composition has a low sealing temperature of 400°C. or lower and is useful for readily sealing IC packages and display panels without application of load. In order to adjust the thermal coefficient of expansion, the sealing glass composition may be used by mixing with 20 vol. % to 55 vol. % of refractory filler powder of such as lead titanate based ceramics, willemite based ceramics, cordierite ceramics, zircon based ceramics or tin oxide based ceramics.

5 Claims, No Drawings

LOW TEMPERATURE SEALING COMPOSITION

BACKGROUND OF THE INVENTION

This invention relates to a low temperature sealing composition, and more particularly, to a low temperature sealing glass composition suitable for hermetically sealing ceramic packages for integrated circuits (ICs) and quartz resonators, and sealing display panels such as vacuum fluorescent displays (VFDs).

A sealing material for hermetically sealing packages for an IC or quartz resonators, and display panels are required to be sealable at a low temperature so as not to deteriorate the enclosed devices due to thermal effects. In addition, it is also necessary that the thermal coefficient of expansion (hereinafter, abbreviated to TCE) of the material is compatible with that of the ceramics or a display panel glass to be used. In particular, the IC packages should be sealed with the material that is high in mechanical strength besides meeting the aforementioned requirements. The material for sealing the IC package is also required to have superior insulating properties to avoid undesirable leak of signal currents. Further, the material for the IC package should have the least possible content of $\alpha$-particle emitting impurities because the soft error often occurs when an IC chip such as DRAM and CCD is exposed to the $\alpha$-particle.

Various sealing materials have been proposed that meet the above mentioned requirements. One of such materials is a $PbO\text{-}B_2O_3$ glass of a low melting temperature. It has also been proposed to use the low melting temperature glass as an admixture with refractory fillers. For example, Japanese Patent Unexamined Publication 229738/1990 discloses a sealing material comprising $PbO\text{-}B_2O_3$ glass powder, lead titanate ceramic powder and low expansion ceramic powder.

It is known about the $PbO\text{-}B_2O_3$ glass that lowering content of $B_2O_3$ generally lowers the glass transformation point resulting in a lower sealing temperature. However, sufficient content of $B_2O_3$ is necessary to make the glass stable, which limites glass composition and makes it impossible to obtain sealing materials usable below 400° C. The sealing temperature of 400° C. or lower is thus difficult to be achieved. This means that the sealing material of the type described is not suitable for sealing packages for heat sensitive devices such as a highly integrated IC, or quartz resonators.

Several sealing materials have also been proposed which are sealable at the temperature of 400° C. or lower. For example, Japanese Patent Publication No. 8060/1988 discloses a sealing material consisting of $PbO\text{-}B_2O_3$ glass powder with $Tl_2O$ contained therein. In addition, U.S. Pat. No. 4,743,302 discloses another sealing material comprising $PbO\text{-}V_2O_5\text{-}TeO_2$ glass powder. However, both of these materials are unfavorable because of the following reasons. The sealing material disclosed in the Japanese Patent Publication No. 8060/1988 includes a highly toxic component, i.e., thallium carbonate in the raw material for the glass. Such a toxic material should be handled using special protective instrument. The sealing material disclosed in U.S. Pat. No. 4,743,302 is more likely to be crystallized and thus requires application of a large load to the package to be sealed.

SUMMARY OF THE INVENTION

Accordingly, a primary object of the present invention is to provide a low temperature sealing composition which meets the requirements for sealing material of IC packages or display panels and which is sealable at the temperature of 400° C. or lower without application of load during sealing operation.

Another object of the present invention is to provide a low temperature sealing composition without use of highly toxic components.

A low temperature sealing composition according to the present invention is glass powder which essentially consists of 45.0 to 85.0 wt. % of PbO, 1.0 to 11.0 wt. % of $B_2O_3$, 1.0 to 45.0 wt. % of $Bi_2O_3$, 0.2 to 10.0 wt. % of $Fe_2O_3$, 0 to 15.0 wt. % of ZnO, 0 to 5.0 wt. % of CuO, 0 to 5.0 wt. % of $V_2O_5$, 0 to 3.0 wt. % of $SnO_2$, 0 to 5.0 wt. % of $SiO_2$ plus $Al_2O_3$, 0 to 7.0 wt. % of BaO, 0 to 5.0 wt. % of $TiO_2$, 0 to 5.0 wt. % of $ZrO_2$ and 0 to 6.0 wt. % of $F_2$.

In addition, a low temperature sealing glass composition according to the present invention comprises 45% to 80% by volume of glass powder and 20% to 55% by volume of refractory filler powder. The glass powder essentially consists of 45.0 to 85.0 wt. % of PbO, 1.0 to 11.0 wt. % of $B_2O_3$, 1.0 to 45.0 wt. % of $Bi_2O_3$, 0.2 to 10.0 wt. % of $Fe_2O_3$, 0 to 15.0 wt. % of ZnO, 0 to 5.0 wt. % of CuO, 0 to 5.0 wt. % of $V_2O_5$, 0 to 3.0 wt. % of $SnO_2$, 0 to 5.0 wt. % of $SiO_2$ plus $Al_2O_3$, 0 to 7.0 wt. % of BaO, 0 to 5.0 wt. % of $TiO_2$, 0 to 5.0 wt. % of $ZrO_2$ and 0 to 6.0 wt. % of $F_2$.

DESCRIPTION OF THE INVENTION

The present inventors have found that, as a result of tremendous studies and considerations, $Fe_2O_3$ is considerably effective for stabilizing $PbO\text{-}B_2O_3$ glass, in particular to $PbO\text{-}B_2O_3$ glass with $Bi_2O_3$ contained therein, and that the above mentioned objects can be achieved with the reduced content of $B_2O_3$ by means of adding $Fe_2O_3$ to the glass composition.

Briefly, the low temperature sealing composition according to the present invention is obtained by means of substituting $Fe_2O_3$ for a part of $B_2O_3$ of the $PbO\text{-}B_2O_3$ glass, thereby reducing the content of $B_2O_3$.

In the low temperature sealing composition according to the present invention, the ingredients of the glass powder are limited as set forth above because of the following reasons.

The content of PbO ranges from 45.0 to 85.0 wt. %, and preferably, from 50.0 to 83.0 wt. %. PbO content of lower than 45 wt. % increases the viscosity of the glass, impeding sufficient flow of the glass at a temperature of 400° C. or lower. On the other hand, PbO content of higher than 85 wt. % causes crystallization upon sealing, which hinders flowing of the glass.

The content of $B_2O_3$ ranges from 1.0 to 11.0 wt. %, and preferably, from 2.0 to 10.0 wt. %. $B_2O_3$ content of lower than 1.0 wt. % makes the glass unstable to cause crystallization upon sealing. Such crystallization behavior also hinders flowing of the glass. $B_2O_3$ content of higher than 11.0 wt. % increases the viscosity of the glass, impeding the glass from sufficient flow at a temperature of 400° C. or lower.

$Bi_2O_3$ has the effect of stabilizing the glass without increasing the viscosity and the content thereof is between 1.0 and 45.0 wt. %, and preferably, between 1.2 and 35.0 wt. %. The above mentioned effect cannot be achieved by $Bi_2O_3$ of less than 1.0 wt. %. $Bi_2O_3$ of more than 45 wt. % is responsible for the increased viscosity of the glass, inhibiting sufficient flow of the glass at a temperature of 400° C. or lower.

$Fe_2O_3$ has the significant effect for stabilizing the glass and the content thereof is within the range of 0.2 to 10.0 wt. %, and preferably, 0.2 to 9.0 wt. %. $Fe_2O_3$ of less than 0.2 wt. % produces no effect of glass stabilization, so the glass significantly crystallizes upon heating. On the other hand, $Fe_2O_3$ of more than 10.0 wt. % is responsible for the increased viscosity of the glass, inhibiting sufficient flow of the glass at a temperature of 400° C. or lower.

The content of ZnO ranges from 0 to 15.0 wt. %, and preferably, from 0 to 13.0 wt. %. While ZnO contributes to stabilizing the glass as well as improving water-resistance thereof, ZnO of more than 15.0 wt. % causes crystallization of the glass to inhibit sufficient flow of it.

The content of CuO ranges from 0 to 5.0 wt. %, and preferably, 0 to 4.0 wt. %. While CuO is known to be the component capable of stabilizing the glass without increasing the viscosity, CuO content of higher than 5.0 wt. % results in precipitation of crystals upon sealing.

$V_2O_5$ contributes to reducing surface tension of the glass and improves flowability thereof. The content of $V_2O_5$ is between 0 and 5.0 wt. %, and preferably, between 0 and 3.0 wt. %. $V_2O_5$ of more than 5.0 wt. % causes the glass to be crystallized significantly and makes the glass difficult to flow.

$SnO_2$ favorably affects on stabilization of the glass and is contained therein ranging from 0 to 3.0 wt. %, and preferably, from 0 to 2.0 wt. %. $SnO_2$ of more than 3.0 wt. % also causes the glass to be crystallized significantly and makes the glass difficult to flow.

The content of $SiO_2$ and $Al_2O_3$ in total ranges from 0 to 5.0 wt. %, and preferably, from 0 to 3.0 wt. %. $SiO_2$ and $Al_2O_3$ can be effectively used to avoid crystallization of the glass. However, the total content thereof exceeding 5.0 wt. % increases viscosity of the glass, which makes the glass to flow only at a temperature higher than 400° C.

The content of BaO ranges from 0 to 7.0 wt. %, and preferably, 0 to 5.0 wt. %. While BaO has the effect of preventing the glass from being crystallized, its content of higher than 7.0 wt. % results in the increased viscosity of the glass. The higher viscosity is responsible for insufficient flow thereof at a temperature of 400° C. or lower.

$TiO_2$ exhibits the effect of stabilizing the glass when being contained in the amount between 0 to 5.0 wt. %, and preferably, between 0 and 1.0 wt. %. With the higher content of $TiO_2$ than 5.0 wt. %, the glass shows significant tendency to be crystallized and to hardly flow.

The content of $ZrO_2$ ranges from 0 to 5.0 wt. %, and preferably, from 0 to 1.0 wt. %. While $ZrO_2$ has the effect of preventing the glass from being crystallized, the higher content thereof than 5.0 wt. % results in the increased viscosity of the glass and makes the glass to hardly flow at a temperature of 400° C. or lower.

The content of $F_2$ is between 0 and 6.0 wt. %. $F_2$ serves to lower the sealing temperature of the glass of a $Bi_2O_3$-rich composition. However, the content higher than 6.0 wt. % strongly influences the stabilization of the glass to lead the glass to crystallization upon sealing. As a result, the glass is reduced in flowability.

Other components may be contained in the glass addition to those described above and the possible examples of these other components are: 5% or less, by weight, of $Ag_2O$, SrO, $P_2O_5$, $Co_2O_3$ and $TeO_2$; 3% or less, by weight, of $Mo_2O_3$, $Rb_2O$, $Cs_2O$, $Nb_2O_5$, $Ta_2O_3$, $CeO_2$, NiO, $Cr_2O_3$ and $Sb_2O_3$; and rare earth oxides such as $La_2O_3$. However, it should be avoided to add any components using highly toxic element such as $Tl_2O$.

The glass having the above mentioned composition is amorphous and no crystal will be precipitated upon sealing. With this glass composition, superior flowability can be achieved accordingly. In addition, the glass transformation point is low, i.e., 300° C. or lower and the viscosity is low as well. The TCE of this glass at 30° to 250° C. is equal to or higher than $115 \times 10^{-7}/°C$. Thus, this glass can be used for sealing, at a low temperature, materials having the relatively high coefficient of thermal expansion compatible with that of glass. It is, however, necessary to adjust the TCE of the glass when the latter is used for sealing IC packages or display panels manufactured with materials having various TCE. For example, the TCE of the glass is required to be lowered for sealing alumina (having the TCE of $70 \times 10^{-7}/°C$.), aluminum nitride (having the TCE of $45 \times 10^{-7}/°C$.), or the display glass panel (having the TCE of $85 \times 10^{-7}/°C$.).

The TCE adaptable to seal IC packages or display panels can be obtained by means of adding of the refractory filler powder of an amount within the above mentioned range to the low temperature sealing glass composition. Suitable refractory filler powder may be: lead titanate based ceramic powder, willemite-based ceramic powder, cordierite ceramic powder, zircon-based ceramic powder, tin oxide based ceramic powder, β-eucryptite ceramic powder, mullite ceramic powder or mixture-thereof. As other fillers than those exemplified above, silica glass, alumina, titanium oxide and niobium pentoxide are also applicable.

In the present invention, the mixing ratio of the glass powder and the filler powder is limited as set forth above because of the following reasons.

The composition with the glass component of less than 45 vol. % (i.e., with the refractory fillers of more than 55 vol. %) makes the mixture insufficient or poor in flowability, which makes the composition unsuitable as the sealing material used at a temperature of 400° C. or lower. On the contrary, in the composition having the glass content of higher than 80 vol. % (i.e., the refractory filler content of lower than 20 vol. %), the TCE will be lowered only by an insufficient extent and is never compatible with materials of the IC packages and display panels.

Described hereinbelow is a method of manufacturing the low temperature sealing composition according to the present invention. Raw materials are blended and mixed to obtain a desired composition, thereafter, melted at 700° to 1000° C. for 1 or 2 hours, and then formed into a plate. The plate is then ground to powder in a ball-mill or the like. The powder is then classified according to predetermined particle sizes to obtain glass powder of a desired size. If desired, the glass powder obtained in this manner may be mixed with refractory filler powder at a specific ratio.

The foregoing features of the low temperature sealing composition according to the present invention will be more readily apparent in the context of a specifically delineated set of examples.

EXAMPLE 1

Table 1 shows effects of addition of $Fe_2O_3$ to PbO-$B_2O_3$ glass. A sample No. 1a is a typical PbO-$B_2O_3$ glass while sample No. 1b is PbO-$B_2O_3$ glass containing a reduced amount of $B_2O_3$ by 3.7 wt. % less than that sample No. 1a. A sample No. 1c is a low temperature sealing composition according to the present invention, in which 1.5 wt. % of $Fe_2O_3$ is added to the sample No. 1b.

and failure are indicated by "good," "OK," and "no good," respectively, in Table 1 as the evaluation results on the flowability and the stability for each sample. It should be understood that "good" is meant to be supe-

TABLE 1

|  | Sample No. | | | | (wt %) |
|---|---|---|---|---|---|
| Composition | 1a | 1b | | 1c | |
| PbO | 77.3 | 77.3 | (80.3) | 77.3 | (79.0) |
| $B_2O_3$ | 10.2 | 6.5 | (6.8) | 6.5 | (6.7) |
| $Bi_2O_3$ | 7.7 | 7.7 | (8.0) | 7.7 | (7.9) |
| $Fe_2O_3$ | — | — | (—) | 1.5 | (1.5) |
| ZnO | 2.8 | 2.8 | (2.9) | 2.8 | (2.9) |
| $SiO_2$ | 1.0 | 1.0 | (1.0) | 1.0 | (1.0) |
| $Al_2O_3$ | 0.5 | 0.5 | (0.5) | 0.5 | (0.5) |
| BaO | 0.5 | 0.5 | (0.5) | 0.5 | (0.5) |
| Sum | 100 wt % | 96.3 wt % | (100 wt %) | 97.8 wt % | (100 wt %) |
| Glass Transformation Point (°C.) | 310 | 261 | | 272 | |
| Flowability | OK | no good | | good | |
| Stability | good | no good | | good | |

The samples being set forth in Table 1 were prepared through the following procedures.

The raw materials were blended and mixed into batches to obtain the compositions indicated in Table 1. Each composition was melted in a platinum crucible at 900° C. for 1 hours and then formed into a thin plate. The plate was ground to powder and passed through a 250-mesh stainless steel screen to obtain the samples having the average particle diameter of 4 μm.

As apparent from Table 1, sample No. 1b with the lower content of $B_2O_3$ has the glass transformation point of 261° C., which is lower by 49° C. than that of the sample No. 1a. However, sample 1b was poor or not good in flowability and stability. On the contrary, sample No. 1c with the addition of $Fe_2O_3$ exhibited the lower glass transformation point of 272° C. and good stability. The flowability of sample No. 1c was also good and much superior to that of sample No. 1a.

These facts indicate that addition of $Fe_2O_3$ with reduction of B2O3 in the $PbO-B_2O_3$ glass insures the good and excellent flowability and stability of the glass, thereby to provide an excellent sealing composition sealable at a low temperature.

The glass transformation point of each sample was determined according to the differential thermal analysis (DTA) while the flowability was determined through the following procedures. Buttons were formed of sample glass powder, respectively. Each button had of 20 mm in outer diameter and 5 mm in thickness. The buttons were heated at 380° C. for 10 minutes. One having resultant diameter larger than 23 mm was considered to be fine and that of between 20 and 23 mm was considered to be fair. In addition, one having the resultant diameter smaller than 20 mm was considered to be failure. The considerations of fine, fair rior to "OK."

The stability was determined through the visual inspection of surfaces of the samples after being subjected to the flowability test. According to the results of the visual inspection, the sample where no crystal was found was considered to be fine ("good") while if any crystals were found in the sample, the sample was considered as failure ("no good").

EXAMPLE 2

Table 2 and Table 3 show various samples of the low temperature sealing composition according to the present invention.

TABLE 2

| | A | B | C | D | E | (wt %) F |
|---|---|---|---|---|---|---|
| PbO | 83.0 | 77.0 | 82.0 | 74.2 | 78.7 | 75.1 |
| $B_2O_3$ | 9.2 | 8.2 | 4.8 | 2.8 | 7.9 | 7.9 |
| $Bi_2O_3$ | 3.0 | 10.3 | 7.2 | 9.5 | 1.2 | 7.3 |
| $Fe_2O_3$ | 3.8 | 0.5 | 1.5 | 8.5 | 3.7 | 2.1 |
| ZnO | — | 3.0 | 4.0 | 4.0 | 6.2 | 2.7 |
| CuO | — | — | — | — | 1.0 | — |
| $V_2O_5$ | — | — | — | — | — | 1.0 |
| $SnO_2$ | — | — | — | 0.5 | — | — |
| $SiO_2$ | 1.0 | 1.0 | 0.5 | — | 1.3 | 0.9 |
| $Al_2O_3$ | — | — | — | 0.5 | — | — |
| BaO | — | — | — | — | — | — |
| $TiO_2$ | — | — | — | — | — | — |
| $ZrO_2$ | — | — | — | — | — | — |
| $F_2$ | — | — | — | — | — | 3.0 |
| Glass Transformation Point (°C.) | 295 | 290 | 287 | 280 | 285 | 246 |
| TCE ($\times 10^{-7}$/°C.) | 115 | 122 | 124 | 124 | 125 | 132 |
| Flowability | good | good | good | good | good | good |

TABLE 3

| | G | H | I | J | K | L | M | N | O | P | (wt %) Q |
|---|---|---|---|---|---|---|---|---|---|---|---|
| PbO | 81.3 | 67.2 | 80.3 | 52.0 | 61.5 | 78.0 | 69.8 | 51.4 | 65.5 | 53.6 | 66.5 |
| $B_2O_3$ | 4.5 | 5.5 | 9.1 | 2.5 | 7.5 | 6.5 | 5.5 | 3.6 | 6.0 | 5.2 | 6.4 |
| $Bi_2O_3$ | 7.2 | 11.0 | 5.1 | 33.2 | 20.5 | 8.5 | 15.0 | 34.0 | 20.0 | 31.8 | 15.8 |
| $Fe_2O_3$ | 0.5 | 1.3 | 0.3 | 8.4 | 3.5 | 1.5 | 1.5 | 1.0 | 1.0 | 6.7 | 3.0 |
| ZnO | 6.0 | 12.0 | — | 3.6 | 3.0 | 4.5 | 2.7 | 5.0 | 4.0 | — | 4.6 |
| CuO | — | — | — | — | — | — | 0.5 | 1.5 | — | 0.7 | 2.2 |
| $V_2O_5$ | — | — | — | — | — | — | 1.0 | — | — | — | 0.5 |
| $SnO_2$ | — | — | — | — | — | — | — | — | — | — | — |
| $SiO_2$ | 0.5 | 1.0 | — | 0.3 | 0.5 | 0.5 | 1.0 | 0.5 | 0.5 | 2.0 | — |
| $Al_2O_3$ | — | — | 0.5 | — | — | — | — | — | — | — | 0.5 |

TABLE 3-continued

| | G | H | I | J | K | L | M | N | O | P | Q (wt %) |
|---|---|---|---|---|---|---|---|---|---|---|---|
| BaO | — | 2.0 | 4.2 | — | — | — | — | — | — | — | — |
| $TiO_2$ | — | — | 0.5 | — | — | — | — | — | — | — | — |
| $ZrO_2$ | — | — | — | 0.5 | — | — | — | — | — | — | — |
| $F_2$ | — | — | — | — | 3.0 | 0.5 | 3.0 | 3.0 | 3.0 | — | 0.5 |
| Glass Transformation Point (°C.) | 280 | 273 | 289 | 270 | 248 | 278 | 244 | 249 | 247 | 264 | 254 |
| TCE ($\times 10^{-7}$/°C.) | 124 | 122 | 115 | 129 | 136 | 123 | 131 | 133 | 133 | 132 | 138 |
| Flowability | good | good | good | good | good | good | good | good | good | good | good |

As apparent from Table 2 and Table 3, samples A through Q has the glass transformation point ranging from 244° to 295° C. and the TCE ranging from 115 to $138 \times 10^{-7}$/°C. All samples exhibited excellent or good flowability.

The samples indicated in Table 2 and Table 3 were prepared in the same manner as in Example 1.

EXAMPLE 3

Table 4 through Table 8 show various samples (samples Nos. 1 to 31) of the low temperature sealing composition for IC packages prepared by mixing refractory filler powder with each of the sample glass powder in Table 2 and Table 3.

TABLE 4

| | 1 | 2 | 3 | 4 | 5 | 6 |
|---|---|---|---|---|---|---|
| Mixing Ratio (vol %) | | | | | | |
| glass powder (Table 2) | (A) 75 | (B) 60 | (C) 60 | (D) 60 | (E) 60 | (F) 60 |
| refractory filler powder | | | | | | |
| lead titanate based ceramic powder | 5 | 5 | — | — | — | 10 |
| willemite based ceramic powder | — | 25 | 30 | 35 | 25 | 20 |
| cordierite ceramic powder | — | — | — | — | 10 | — |
| zircon based ceramic powder | — | 10 | — | 5 | — | — |
| tin oxide based ceramic powder | — | — | 10 | — | — | 10 |
| β-eucryptite ceramic powder | 20 | — | — | — | — | — |
| mullite ceramic powder | — | — | — | 5 | — | — |
| Sealing Temperature (°C.) | 400 | 390 | 400 | 380 | 390 | 360 |
| Bending Strength (kg/cm$^2$) | 590 | 640 | 650 | 630 | 660 | 610 |
| Volume Resistivity (150° C., log Ω · cm) | 14.4 | 14.8 | 13.8 | 14.2 | 14.6 | 13.2 |
| α-particle Emission Quantity (count/cm$^2$ · hr) | 0.12 | 0.11 | 0.25 | 0.13 | 0.15 | 0.25 |
| TCE ($\times 10^{-7}$/°C.) | 60 | 69 | 73 | 68 | 69 | 68 |

TABLE 5

| | 7 | 8 | 9 | 10 | 11 | 12 |
|---|---|---|---|---|---|---|
| Mixing Ratio (vol %) | | | | | | |
| glass powder (Table 3) | (G) 75 | (H) 60 | (I) 60 | (J) 60 | (K) 50 | (L) 55 |
| refractory filler powder | | | | | | |
| lead titanate based ceramic powder | 20 | — | — | — | — | — |
| willemite based ceramic powder | — | 20 | 10 | 30 | — | — |
| cordierite ceramic powder | 5 | 10 | 10 | — | 35 | 30 |
| zircon based ceramic powder | — | 10 | 20 | — | 15 | 15 |
| tin oxide based ceramic powder | — | — | — | 10 | — | — |
| β-eucryptite ceramic powder | — | — | — | — | — | — |
| mullite ceramic powder | — | — | — | — | — | — |
| Sealing Temperature (°C.) | 370 | 380 | 400 | 370 | 370 | 390 |
| Bending Strength (kg/cm$^2$) | 580 | 610 | 630 | 610 | 570 | 670 |
| Volume Resistivity (150° C., log Ω · cm) | 14.3 | 13.2 | 12.8 | 13.1 | 12.8 | 13.4 |
| α-particle Emission Quantity (count/cm$^2$ · hr) | 0.12 | 0.17 | 0.12 | 0.15 | 0.16 | 0.09 |
| TCE ($\times 10^{-7}$/°C.) | 65 | 67 | 68 | 72 | 65 | 69 |

TABLE 6

| | 13 | 14 | 15 | 16 | 17 |
|---|---|---|---|---|---|
| Mixing Ratio (vol %) | | | | | |
| glass powder (Table 3) | (M) 60 | (N) 60 | (O) 60 | (P) 53 | (Q) 55 |
| refractory filler powder | | | | | |
| lead titanate based ceramic powder | 5 | — | 10 | — | — |
| willemite based ceramic powder | 25 | — | 20 | 40 | — |
| cordierite ceramic powder | — | 30 | — | — | 30 |
| zircon based ceramic powder | 10 | 10 | 10 | — | 15 |
| tin oxide based ceramic powder | — | — | — | 7 | — |
| β-eucryptite ceramic powder | — | — | — | — | — |
| mullite ceramic powder | — | — | — | — | — |
| Sealing Temperature (°C.) | 360 | 360 | 360 | 380 | 380 |
| Bending Strength (kg/cm$^2$) | 620 | 650 | 620 | 600 | 620 |
| Volume Resistivity (150° C., log Ω · cm) | 14.5 | 15.2 | 14.6 | 15.0 | 13.3 |
| α-particle Emission Quantity (count/cm$^2$ · hr) | 0.20 | 0.22 | 0.10 | 0.15 | 0.25 |
| TCE ($\times 10^{-7}$/°C.) | 64 | 64 | 67 | 67 | 67 |

TABLE 7

| | 18 | 19 | 20 | 21 | 22 | 23 | 24 |
|---|---|---|---|---|---|---|---|
| Mixing Ratio (vol %) | | | | | | | |
| glass powder (Tables 2 & 3) | (A) 55 | (C) 55 | (F) 55 | (G) 50 | (I) 55 | (K) 55 | (L) 50 |
| refractory filler powder | | | | | | | |

TABLE 7-continued

|  | 18 | 19 | 20 | 21 | 22 | 23 | 24 |
|---|---|---|---|---|---|---|---|
| lead titanate based ceramic powder | 10 | 15 | 20 | 15 | 20 | 20 | 20 |
| willemite based ceramic powder | 15 | 30 | 25 | 25 | — | 15 | 20 |
| cordierite ceramic powder | 20 | — | — | 10 | 20 | — | 10 |
| zircon based ceramic powder | — | — | — | — | 5 | 10 | — |
| tin oxide based ceramic powder | — | — | — | — | — | — | — |
| $\beta$-eucryptite ceramic powder | — | — | — | — | — | — | — |
| mullite ceramic powder | — | — | — | — | — | — | — |
| Sealing Temperature (°C.) | 400 | 400 | 380 | 400 | 400 | 380 | 400 |
| Bending Strength (kg/cm$^2$) | 680 | 640 | 650 | 670 | 660 | 610 | 650 |
| Volume Resistivity (150° C., log $\Omega \cdot$ cm) | 13.8 | 14.8 | 13.8 | 13.6 | 13.6 | 12.9 | 13.7 |
| $\alpha$-particle Emission Quantity (count/cm$^2 \cdot$ hr) | 0.12 | 0.11 | 0.13 | 0.13 | 0.11 | 0.12 | 0.19 |
| TCE ($\times 10^{-7}$/°C.) | 51 | 55 | 55 | 52 | 55 | 55 | 49 |

TABLE 8

|  | 25 | 26 | 27 | 28 | 29 | 30 | 31 |
|---|---|---|---|---|---|---|---|
| Mixing Ratio (vol %) | | | | | | | |
| glass powder (Tables 2 & 3) | (B) 65 | (D) 70 | (E) 65 | (G) 65 | (H) 65 | (I) 65 | (L) 65 |
| refractory filler powder | | | | | | | |
| lead titanate based ceramic powder | 10 | 15 | 5 | 10 | 5 | 20 | 10 |
| willemite based ceramic powder | — | — | — | 15 | — | — | — |
| cordierite ceramic powder | — | — | 10 | — | 20 | — | — |
| zircon based ceramic powder | 25 | — | — | 10 | 10 | 15 | 25 |
| tin oxide based ceramic powder | — | — | 20 | — | — | — | — |
| $\beta$-eucryptite ceramic powder | — | — | — | — | — | — | — |
| mullite ceramic powder | — | 15 | — | — | — | — | — |
| Sealing Temperature (°C.) | 390 | 380 | 380 | 380 | 370 | 380 | 380 |
| Volume Resistivity (150° C., log $\Omega \cdot$ cm) | 14.1 | 14.3 | 14.1 | 13.5 | 14.2 | 14.5 | 14.3 |
| TCE ($\times 10^{-7}$/°C.) | 74 | 78 | 73 | 76 | 74 | 73 | 74 |

As apparent from Table 4 through Table 7, samples Nos. 1 through 24 have satisfactory properties: the sealing temperature ranging from 360° to 400° C., the bending strength ranging from 570 to 680 kg/cm$^2$, the volume resistivity ranging from 12.8 to 15.2 $\Omega$.cm and the amount of $\alpha$-particle emission ranging from 0.09 to 0.25 count/cm$^2$.hr. The TCE of the samples Nos. 1 through 17 was between 60 and 73$\times 10^{-7}$/°C. and that of the samples Nos. 18 through 24 was between 49 and 55$\times 10^{-7}$/°C. The TCE of these two groups are approximate to those of alumina (70$\times 10^{-7}$/°C.) and aluminium nitride (45$\times 10^{-7}$/°C.), respectively.

As apparent from Table 8, samples Nos. 25 to 31 have a desired sealing temperature ranging from 370° to 380° C. and a high volume resistivity ranging from 13.5 to 14.5 $\Omega$.cm. The TCE of these samples is in the range from 73 to 76$\times 10^{-7}$/°C., which is approximate to that of the display glass panel (85$\times 10^{-7}$/°C.).

These facts indicate that the low temperature sealing composition according to the present invention meets the requirements for the sealing material used to seal IC packages or display panels. In particular, the low temperature sealing composition according to the present invention is sealable at a temperature of 400° C. or lower and the TCE thereof can be adjusted to be compatible with that of alumina, aluminium nitride or display glass panels.

The TCE was measured by a dilatometer. The sealing temperature was defined as the temperature at which a button of 20 mm in outer diameter and 5 mm in thick formed of each sample was heated and deformed to 21 mm or larger in diameter. The bending strength was measured according to the three-load method on each sample sintered and formed to square pillars of 10$\times$10$\times$50 mm. The volume resistivity was measured at 150° C. using a megohm meter, and the $\alpha$-particle emission was measured using a ZnS scintillation counter.

The refractory filler powder indicated in Table 4 through Table 8 were prepared through the following procedures.

Lead titanate based ceramic powder was prepared by blending raw material powder in the ratio of 65 wt. % of PbO, 30 wt. % of TiO$_2$ and 5 wt. % of CaO. The blend was mixed and sintered at 1100° C. for 5 hours and the resultant sintered body was then ground into powder with alumina balls. The powder was sieved using a 350-mesh stainless steel screen to obtain powder having the average particle diameter of 5 $\mu$m.

Willemite based ceramic powder was prepared by blending raw materials in the ratio of 70 wt. % of ZnO, 25 wt. % of SiO$_2$ and 5 wt. % of Al$_2$O$_3$. The blend was mixed and sintered at 1440° C. for 15 hours. The sintered body was then ground into powder and sieved using a 250-mesh stainless steel screen to obtain a desired ceramic powder.

Cordierite ceramic powder was prepared by blending powder of magnesium oxide, aluminium oxide and high purity quartz sand in the ratio of 2MgO.2Al$_2$O$_3$.5SiO$_2$. The blend was mixed and sintered at 1400° C. for 10 hours. The sintered body was then ground into powder and sieved using a 250-mesh stainless steel screen to obtain the powder used.

Zircon based ceramic powder was prepared through the following processes. Natural zircon sand was subjected to soda decomposition and the resultant product was dissolved in hydrochloric acid, following which concentration and crystallization were repeated, whereby obtaining zirconium oxychloride with extremely low content of $\alpha$-particle emitting substances, i.e., uranium (U) and thorium (Th). The zirconium oxychloride was neutralized with an alkali. The resultant product was then heated, whereby obtaining purified zirconium oxide (ZrO$_2$). The purified zirconium oxide was mixed with high purity silica powder and ferric oxide to form a ratio of 66 wt. % ZrO$_2$, 32 wt. % SiO$_2$ and 2 wt. % Fe$_2$O$_3$. The mixture was sintered at 1400° C. for 16 hours. The resultant sintered body was ground into powder and sieved using a 250-mesh stainless steel screen to obtain the powder used.

Tin oxide based ceramic powder was prepared by blending raw powder in the ratio of 93 wt. % of $SnO_2$, 2 wt. % of $TiO_2$ and 5 wt. % of MnO. The blend was mixed and sintered at 1400° C. for 16 hours. The sintered body was then ground into powder and sieved using a 250-mesh stainless steel screen to obtain the powder used.

Beta-eucryptite ceramic powder was obtained by mixing lithium carbonate, alumina and high purity quartz sand into the composition of $Li_2O \cdot Al_2O_3 \cdot 2SiO_2$. The mixture was sintered at 1250° C. for 5 hours. The sintered body was then ground into powder and sieved using a 250-mesh stainless steel screen to obtain the powder used.

Mullite ceramic powder was prepared by blending aluminium oxide and high purity quartz sand into the composition of $3Al_2O_3 \cdot 2SiO_2$. The blend was mixed and sintered at 1600° C. for 10 hours. The sintered body was then ground into powder and sieved using a 250-mesh stainless steel screen to obtain the powder as used.

As mentioned above, the low temperature sealing composition according to the present invention fulfills various properties and features required for the sealing materials to seal IC packages or display panels. The present composition is particularly suitable as the sealing material for sealing ceramic or glass containers containing temperature sensitive devices because it is sealable at a temperature of 400° C. or lower without load. In addition, the present sealing composition is readily produced from raw materials of the glass containing no highly toxic materials, which otherwise should be handled using special protective instrument.

What is claimed is:

1. A low temperature sealing composition consisting of glass powder, said glass powder consisting essentially of 45.0 to 85.0 wt. % of PbO, 1.0 to 11.0 wt. % of $B_2O_3$, 1.0 to 45.0 wt. % of $Bi_2O_3$, 0.2 to 10.0 wt. % of $Fe_2O_3$, 0 to 15.0 wt. % of ZnO, 0 to 5.0 wt. % of CuO, 0 to 5.0 wt. % of $V_2O_5$, 0 to 3.0 wt. % of $SnO_2$, 0 to 5.0 wt. % of $SiO_2$ plus $Al_2O_3$, 0 to 7.0 wt. % of BaO, 0 to 5.0 wt. % of $TiO_2$, 0 to 5.0 wt. % of $ZrO_2$ and 0 to 6.0 wt. % of $F_2$.

2. A low temperature sealing composition as claimed in claim 1, said glass powder consisting essentially of 50.0 to 83.0 wt. % of PbO, 2.0 to 10.0 wt. % of $B_2O_3$, 1.2 to 35.0 wt. % of $Bi_2O_3$, 0.2 to 9.0 wt. % of $Fe_2O_3$, 0 to 13.0 wt. % of ZnO, 0 to 4.0 wt. % of CuO, 0 to 3.0 wt. % of $V_2O_5$, 0 to 2.0 wt. % of $SnO_2$, 0 to 3.0 wt. % of $SiO_2$ plus $Al_2O_3$, 0 to 5.0 wt. % of BaO, 0 to 1.0 wt. % of $TiO_2$, 0 to 1.0 wt. % of $ZrO_2$ and 0 to 6.0 wt. % of $F_2$.

3. A low temperature sealing composition comprising 45 vol. % to 80 vol. % of glass powder and 20 vol. % to 55 vol. % of refractory filler powder, said glass powder consisting essentially of 45.0 to 85.0 wt. % of PbO, 1.0 to 11.0 wt. % of $B_2O_3$, 1.0 to 45.0 wt. % of $Bi_2O_3$, 0.2 to 10.0 wt. % of $Fe_2O_3$, 0 to 15.0 wt. % of ZnO, 0 to 5.0 wt. % of CuO, 0 to 5.0 wt. % of $V_2O_5$, 0 to 3.0 wt. % of $SnO_2$, 0 to 5.0 wt. % of $SiO_2$ plus $Al_2O_3$, 0 to 7.0 wt. % of BaO, 0 to 5.0 wt. % of $TiO_2$, 0 to 5.0 wt. % of $ZrO_2$ and 0 to 6.0 wt. % of $F_2$.

4. A low temperature sealing composition as claimed in claim 3, said glass powder consisting essentially of 50.0 to 83.0 wt. % of PbO, 2.0 to 10.0 wt. % of $B_2O_3$, 1.2 to 35.0 wt. % of $Bi_2O_3$, 0.2 to 9.0 wt. % of $Fe_2O_3$, 0 to 13.0 wt. % of ZnO, 0 to 4.0 wt. % of CuO, 0 to 3.0 wt. % of $V_2O_5$, 0 to 2.0 wt. % of $SnO_2$, 0 to 3.0 wt. % of $SiO_2$ plus $Al_2O_3$, 0 to 5.0 wt. % of BaO, 0 to 1.0 wt. % of $TiO_2$, 0 to 1.0 wt. % of $ZrO_2$ and 0 to 6.0 wt. % of $F_2$.

5. A low temperature sealing composition as claimed in claim 3, said refractory filler powder comprising at least one element which is selected from the group consisting of lead titanate based ceramic powder, willemite based ceramic powder, cordierite ceramic powder, zircon based ceramic powder, tin oxide based ceramic powder, $\beta$-eucryptite ceramic powder, and mullite ceramic powder.

* * * * *